(12) United States Patent
Laser

(10) Patent No.: US 8,120,650 B2
(45) Date of Patent: Feb. 21, 2012

(54) VIDEO FISHING ROD WITH UNDERWATER OBSERVATION GEAR

(76) Inventor: Vadim Laser, Maineville, OH (US)

( * ) Notice: Subject to any disclaimer, the term of this patent is extended or adjusted under 35 U.S.C. 154(b) by 1461 days.

(21) Appl. No.: 11/614,946

(22) Filed: Dec. 21, 2006

(65) Prior Publication Data

US 2008/0148621 A1  Jun. 26, 2008

(51) Int. Cl.
*H04N 7/18* (2006.01)
(52) U.S. Cl. .................. 348/81; 43/4; 43/43.1; 43/44.98
(58) Field of Classification Search .................. 348/81; 43/4, 43.1, 44.98
See application file for complete search history.

(56) References Cited

U.S. PATENT DOCUMENTS

| | | | | |
|---|---|---|---|---|
| 5,414,951 A | * | 5/1995 | Martin | 43/17.5 |
| 5,738,433 A | * | 4/1998 | Sparks | 362/109 |
| 7,347,607 B1 | * | 3/2008 | Hook | 362/577 |

* cited by examiner

*Primary Examiner* — Liangche A Wang
(74) *Attorney, Agent, or Firm* — Hasse & Nesbitt LLC; Daniel F. Nesbitt

(57) ABSTRACT

A video fishing rod with underwater observation gear as fishing equipment, allowing surveillance of the bait and fish around it, and includes a video monitor attachable to the fishing pole, miniature submersible video camera attached close to the end of the fishing line for transmitting video images up to the monitor via the same fishing line without the use of a video cable.

13 Claims, 5 Drawing Sheets

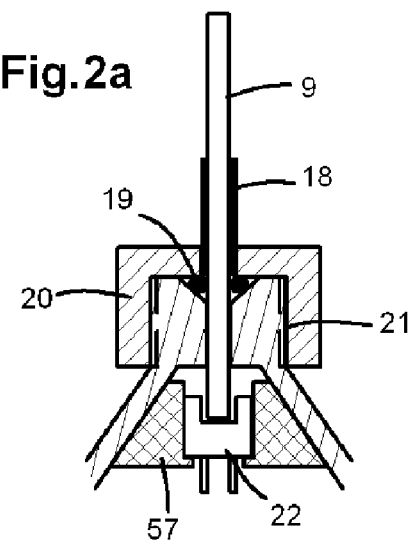
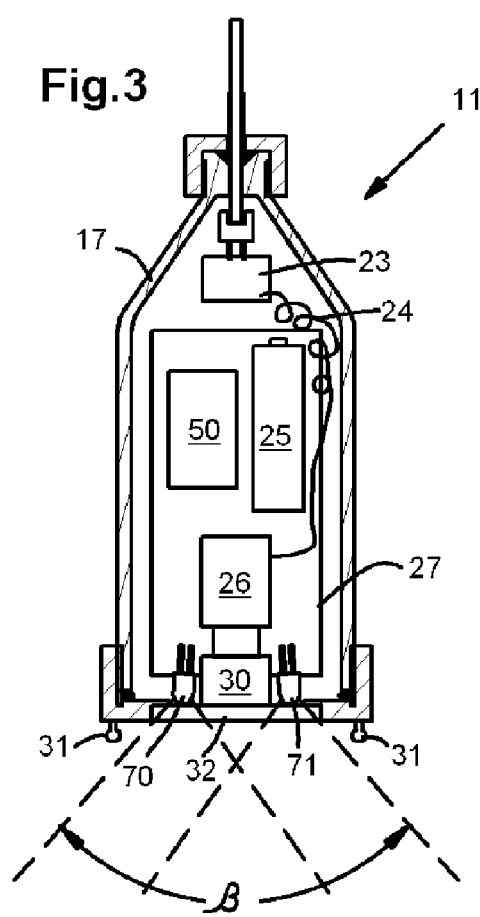
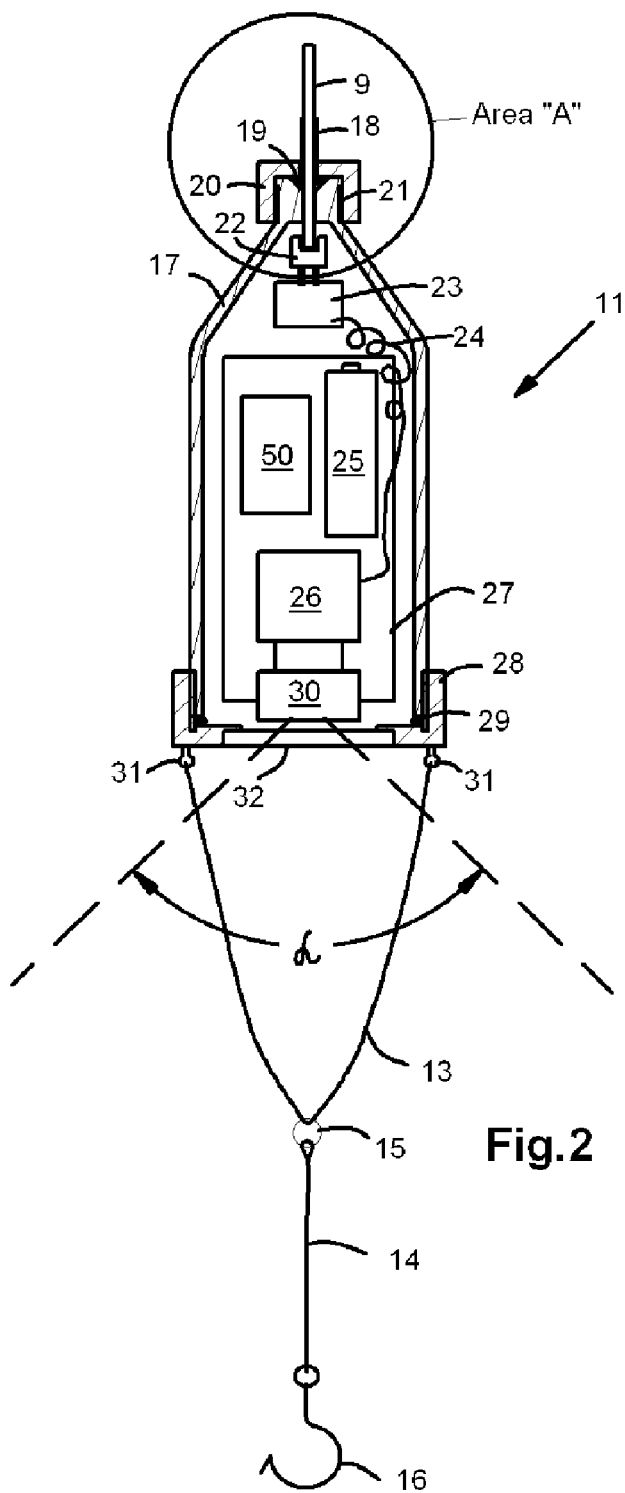

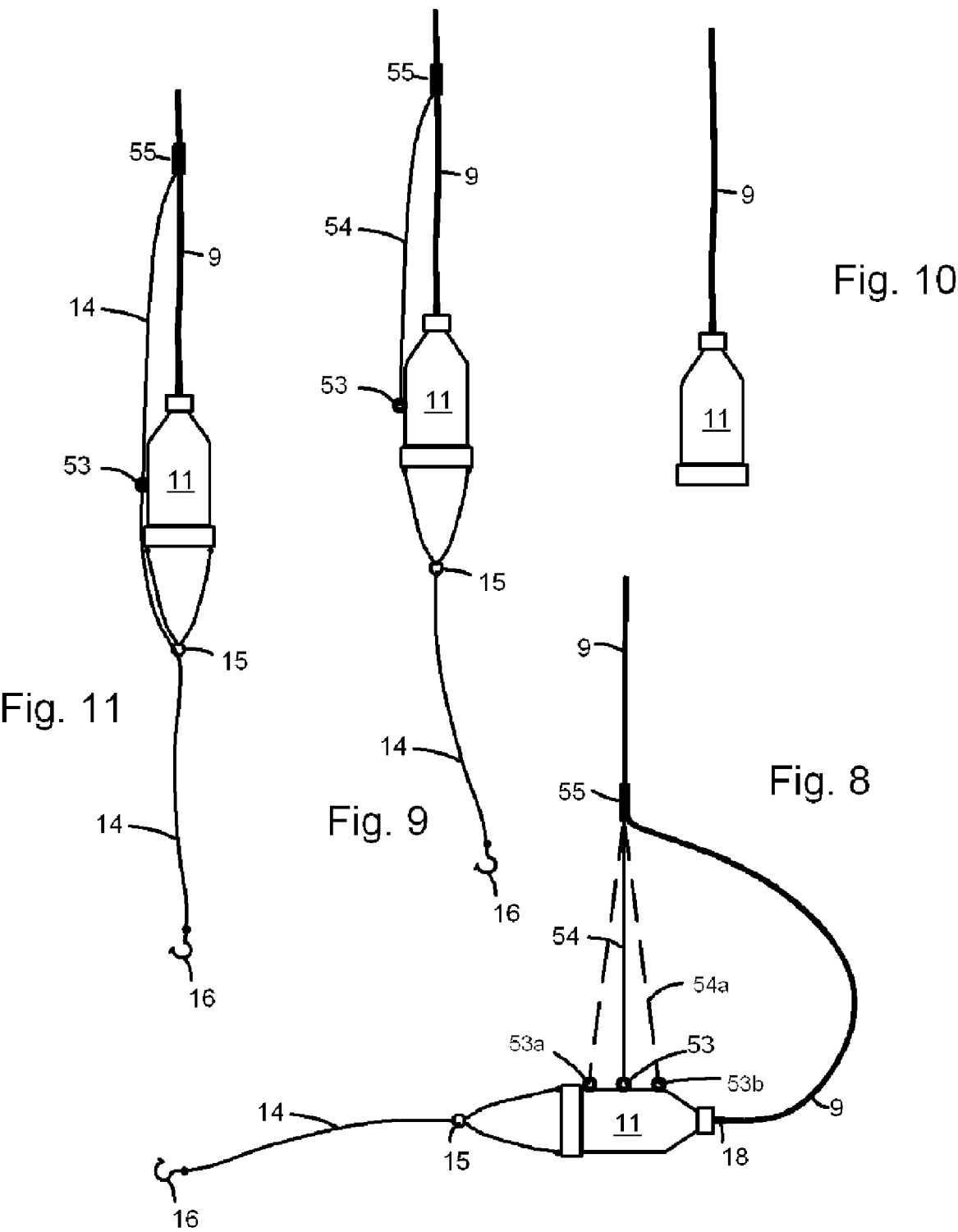

VIDEO FISHING ROD WITH UNDERWATER OBSERVATION GEAR

BACKGROUND OF THE INVENTION

This invention is concerned with the recreational fishing equipment that enhances the pleasure of fishing by allowing a fisherman to see underwater space in the locality of the hook and bate. The devices known in the art that offer similar viewing are based on the use of sealed submersible video cameras attached to the end of a coaxial video cable. The cable transmits video signals from the camera to the video monitor placed near the fisherman. Such submersible video systems are especially popular among the ice fishing anglers as they help to realize better the situation under the ice, which blocks direct observations. Under water video cameras are also used on limited scale by professional fishermen to improve efficiency of fishing. There is some evidence of use the underwater video equipment by recreational anglers in warm waters of streams and rivers. U.S. Pat. Nos. 6,057,879, 6,784,920, 6,091,443, 6,262,761, 6,476,853 describe variations of the systems and equipment having in common a submersible video camera transmitting video signal to a monitor located above the water via a common video cable. All such systems have some drawbacks that this invention is destined to remove. One problem with the existing systems is that the actual use of them is quite cumbersome. Typically, the user needs to unwind or spread the video cable, connect the distal end of it to the camera, secure the proximal end to ensure the cable will not slip off in to the water, connect the cable to the monitor, and hookup the 12-volt battery. Then he would use two separate lines at the same time: the fishing line and the video cable line, which is much less flexible than the fishing line. The other problem with the existing systems is the relatively high cost of the small diameter coaxial cable. Children and retirees constitute the main part of population that engages in recreational fishing. The proposed invention allows the video capable fishing rod to be affordable to everybody, at the same time offering compactness and convenience of use.

SUMMARY OF THE INVENTION

The invention relates to a video fishing rod system comprising a fishing pole having a handle, a reel with a fiber optic fishing line, a sealed submersible video camera attached at the distal end of the fiber optic fishing line, a leader with a fishing hook attached proximate the video camera, a video display monitor with internal battery cells and attached to the fishing pole, typically near its handle, a miniature battery housed inside the submersible camera to power the imaging electronics and optic-electronic components, which provide communication between the video camera and the video display monitor via the fiber optic fishing line.

The fiber optic fishing line comprises an optical fiber or equivalent that replaces the conventional monofilament fishing line. Generally, the fiber-optic line comprises a colorless monofilament plastic fiber with a core having a first refractive index, and a clear cladding made of a plastic material with a second optical refractive index lower than the first refractive index. This condition allows efficient propagation of optical energy (that is, light signals) along the length of the fiber-optic line. Such optical fishing line does not look much different from a conventional monofilament fishing line. A fiber-optic line with the diameter from about 0.5 mm to about 1.0 mm has the strength and durability sufficient for its use as a monofilament fishing line. An additional top layer of protective plastic, such as polyurethane, vinyl or UV curable epoxy, improves resistance of the fiber-optic line to wear and tear.

The proposed invention utilizes a miniature submersible video camera positioned above or aside the baited fishing hook. The camera transmits live video images of the space in its field of view via the fiber-optic fishing line to the portable video monitor, typically a miniature LCD monitor, located near the person who is using the fishing pole (that is, an angler) or other observer. This arrangement allows recreational fishing to be a lot more fun and instructive. An angler can see the bait and monitor the process of a fish getting on the hook. Such compact, ready to use fishing gear is especially attractive to children and useful to ice-fishing, fresh water, and seawater anglers.

The invention also relates to underwater viewing system using the submersible video camera for general observation under water, without a fishing hook. The underwater viewing system comprises a pole having a handle, a reel with a fiber optic fishing line, a sealed submersible video camera with an imbedded LED illuminator and attached at the distal end of the fiber optic fishing line, a video display monitor attached to the pole, typically near its handle, one battery imbedded into the camera to power the imaging and optic-electronic components responsible for taking images and providing communication between the video camera and the video display monitor, and the other battery imbedded into the video monitor.

BRIEF DESCRIPTION OF THE DRAWINGS

FIG. 2 shows the cross section of the submersible video camera attached to the distal end of the optical fishing line, and having a leader with the fishing hook attached to the front side of the camera.

FIG. 2a shows an enlarged portion of the FIG. 2 drawing, illustrating the attachment of the optical line to the camera and its interaction with the optical transmitter.

FIG. 3 shows the cross section of the submersible video camera with the internal LED illuminating the scene.

FIG. 8 illustrates the use of the video camera in a horizontal orientation perpendicular to the descending optical fishing line.

FIG. 9 illustrates an alternative means for fastening of the video camera to the optical fishing line.

FIG. 10 illustrates the use of the submersible video camera without a fishing hook for general observation under water.

FIG. 11 illustrates an alternative means for fastening of the fishing hook to optical fishing line.

DETAILED DESCRIPTION OF THE INVENTION

Figure 1:
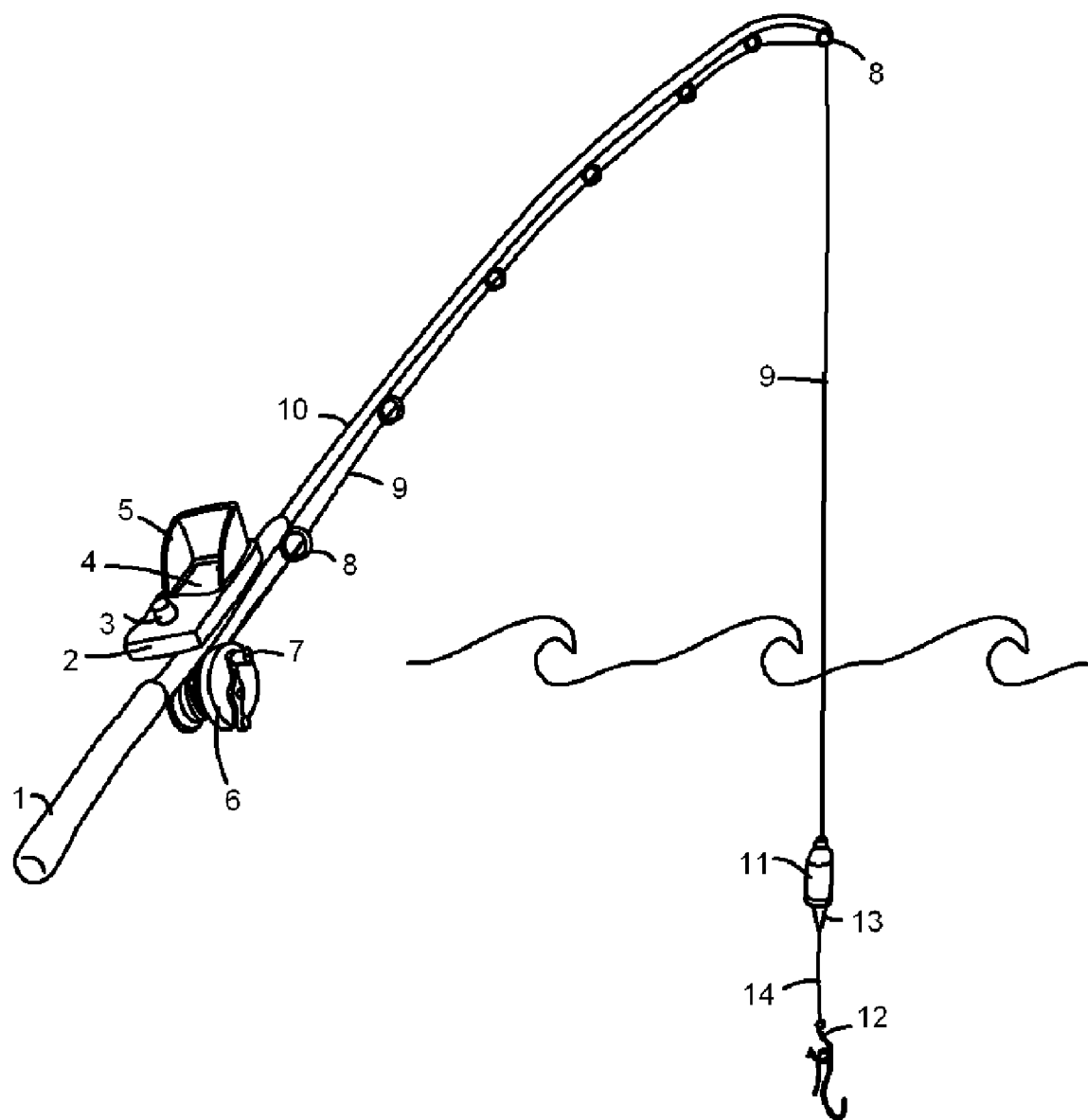
FIG. 1 illustrates the complete video fishing rod system.

The video fishing rod system shown on the FIG. 1 comprises a fishing pole 10 having a handle 1. The video monitor 2 is attached to the fishing pole 10 just above the handle 1. The reel 6 with the reel handle 7 is secured traditionally to the pole below the monitor 2. The monitor 2 has a TFT LCD display 4, a hood 5, a brightness control and power switch 3. The monitor also uses removable and replaceable battery cells as a power source, and not shown here for clarity. The fishing line 9 is a monofilament plastic fiber-optic line that is wound on the bobbin of the reel 6. The fishing line is threaded through the supporting rings 8 attached to the elongated main body of the fishing pole 10. At the distal end of the fishing line, a miniature color or monochrome video camera 11 based on a complementary metal oxide semiconductor (CMOS) image sensor is attached. A fishing hook 12 is attached to a front end of the camera through the leader line 14 and the leader support line 13, as illustrated.

FIG. 2 and FIG. 2a illustrate attachment of the submersible video camera 11 to the fiber optic fishing line 9, and to the fishing hook 16, respectively. The submersible video camera 11 is housed in a hermetically sealed cylindrical enclosure having a clear acrylic or glass window 32 at the front end (the bottom side as shown in FIG. 2). The window 32 is integral with a cover ring 28, which can be unscrewed to gain access for replacing the battery 25. The battery 25 can be rechargeable or disposable. An optional power switch is also located inside the enclosure. The power converter 50 prepares the voltages needed for the electronics of the submersible camera. The CMOS color video device 26 with the imaging lens 30 is located near the front end of the interior of the housing 17 of the camera 11.

The lens 30 with the viewing angle α delivers observation of a space surrounding the fishing hook 16. The CMOS video device 26, the battery 25 and the power converter 50 are mounted on the removable plate 27. The flexible wire 24 connects the CMOS video device 26 with a transmitting means located at the back end (top side) of the housing 17, for transmitting the video image signal from the video device 26. The length of the flexible wire 24 allows the removable plate 27 to be pulled out of the front opening of the housing 17 far enough for replacing of the battery 25.

The preferable type of the transmitting means is an analog transmitter with the amplitude modulation of the optical power (what optical power?). A digital transmitter is also acceptable especially if a very long, longer than 200 feet, optical fiber is considered. The digital transmitter will require using a corresponding digital receiver on the other end of the fiber, as discussed later. The analog transmitter is less expensive, and is conveniently used for the most popular uses of the invention. The transmitter comprises the LED 22 and the LED driver 23. A semiconductor laser can be used in place of the LED if much longer optical fiber length is desired. An LED is less expensive yet suitable for fiber optic communications, and can be used successfully with fishing line of up to about 200 feet long, which is sufficient in most practical uses of a video fishing pole system. Front side of the LED from which light is emitted has a cavity in a shape of a well, sized to receive an end of the fiber-optic line. The distal end of the fiber-optic line 9 is inserted trough a mechanical bracket 20 into the well of the LED 23. The mechanical bracket nut 20, O-ring 19 and a strain relief sleeve 18 for a collet or chuck assembly 21 to accomplish a reliable grip of the fiber 9 near the distal end. If a part of the fiber-optic line 9 is damaged, the distal end can be removed from the chuck assembly 21, and a fresh distal end made by cutting the fiber-optic line with a sharp blade can be re-inserted through the strain relief sleeve and into the well of the LED 22, and re-secured by tightening the bracket nut.

The O-ring 19 assures water tight seal at the fiber optic line entrance. The LED holder 57 can be part of the housing or bonded to it. The LED 22 also can be bonded to the holder 57, thus providing an additional sealed barrier against water leakage. Likewise, the ring nut 28, which holds the round window 32, has an O-ring 29, which assures a water tight seal at the front end of the housing 17. Two clips 31 attached to the ring nut 28 are used to fasten the ends of a short piece of regular fishing line 13, which support the leader 14. A swivel 15 is attached to or rides near the middle of the support line 13. The end of the leader 14 opposite the fishing hook 16 is tied to the swivel 15. Preferably, the leader support line 13 has a tensile strength that is lower than the tensile strength of the optical fishing line 9. Also, the grip of the optical fiber 9 provided by the bracketing contraption 20 is configured to be definitely stronger than the leader support line 13, so that in a case the pulling force on the fishing hook 16 is overwhelmingly strong, the line 13 breaks, acting as a fuse. This provides an assurance that the submersible camera 11 remains attached to the fiber optic line 9, to prevent loss of the camera 11 into the watery depths below.

The FIG. 3 shows the pair of LED 70 and 71 mounted inside the submersible camera housing 11 against the window 32 near the viewing lens 30. These LED produce light beam β either of near infrared or visible spectrum. This feature can be very useful for underwater observation at a substantial depth, at night or under the ice.

Figure 4:
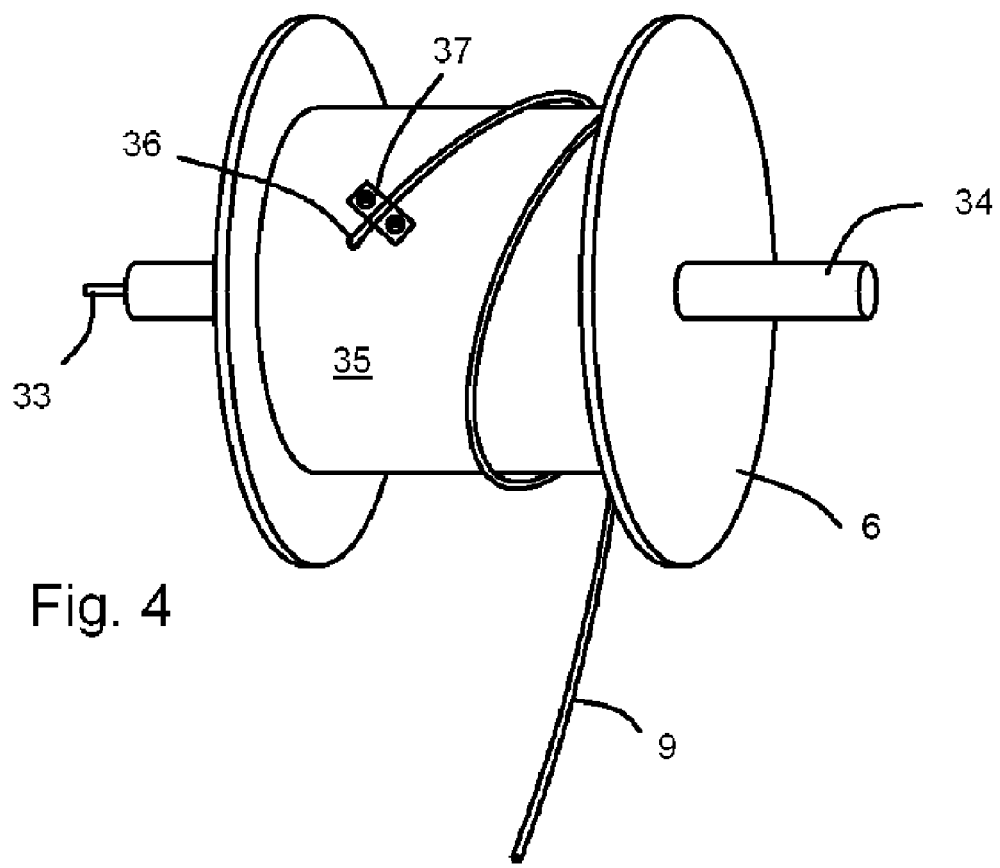
FIG. 4 illustrates the bobbin on the reel that holds the optical fishing line.
Figure 5:
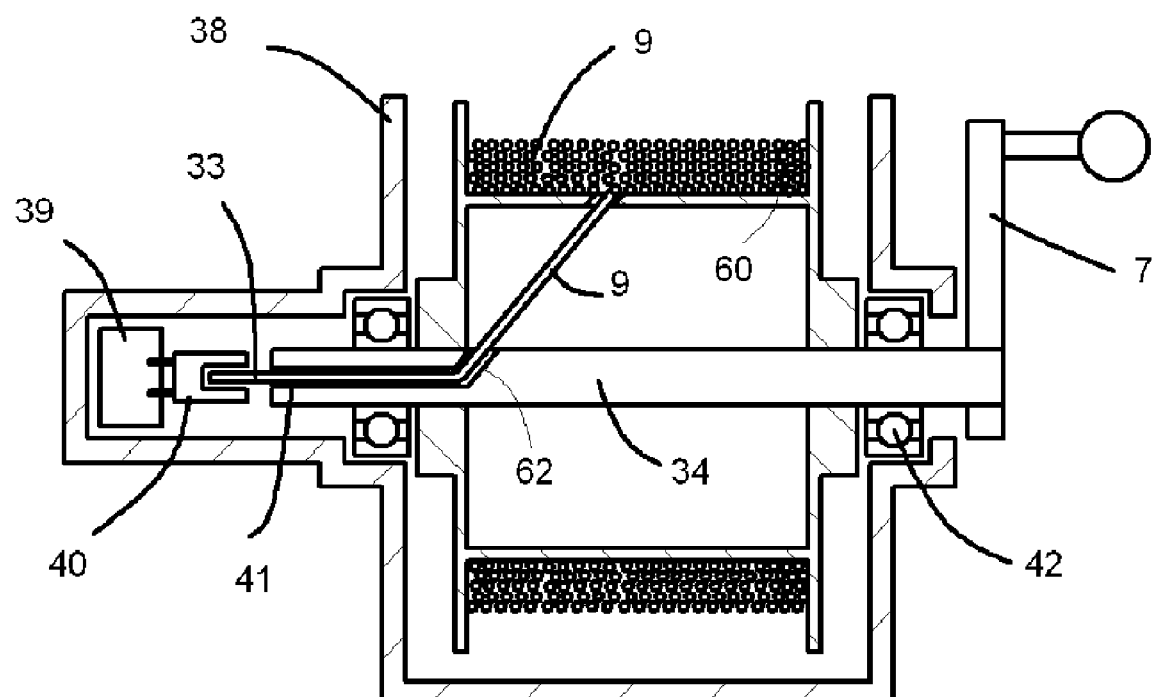
FIG. 5 illustrates the cross section of the reel and the bobbin with the metal shaft of the reel.

The FIG. 4 and FIG. 5 show how the proximate end of the fiber optic line 9 is wrapped around the spool 35. The spool 35 is a part of the reel assembly 38. The core of the spool has a shaft 34 that has a channel 41 going through the center of the shaft 34, starting from one end of the shaft, then turning away from the axis at an elbow 62 (typically at an angle of about 45°, towards the cylindrical surface of the spool. The proximal end 33 of the fiber-optic line 9 first passes through the opening 36 in the spool drum 60, and is secured to the outer surface of the drum 60 of the spool, such as with a bracket 37. Then the fiber-optic line 9 goes through into the elbow 62 of the channel 41, and exits channel 41 from the end of the shaft 34. An optical receiver, shown as photo detector 40, is housed in an extension of the reel 38 near the end of shaft 34. The proximal end 41 of fiber-optic line 9 is inserted into a corresponding well of the photo detector 40.

Figure 6:
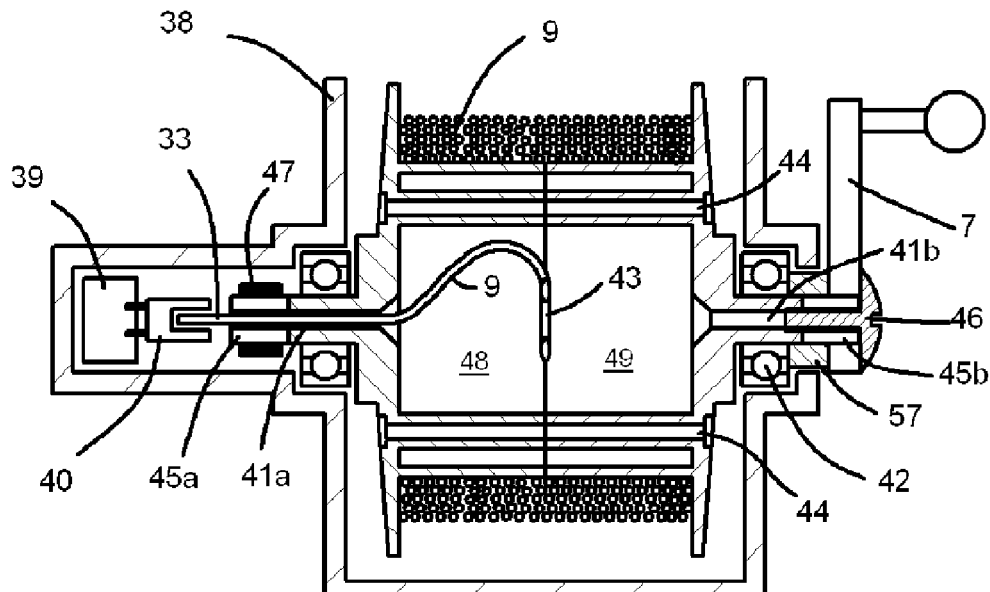
FIG. 6 illustrates a cross section of the reel and the bobbin, without the metal shaft.

FIG. 6 shows another embodiment of a reel 38. In this embodiment the spool has no metal shaft and is made of two identical plastic or metal cylindrical halves 48 and 49. The halves are joined with screws or other fasteners protruding through mating channels 44. Alternatively, they can be bonded ultrasonically or with glue or solvent. The plastic shaft extensions on each side are inserted in the bearings 42. There are a round channels 41a and 41b made on the axis of the each half of the spool, respectively. On one side channel 41a is used as a conduit for the proximal end 33 of fiber-optic line 9, directing it into the well of photo detector 40. The ends 45a and 45b of the plastic shaft extensions are split into segments to serve as fingers of collet-type chucks. The ring 47 constricts these end 45a segments, thus clamping the end 33 of the fiber optic line 9 and secures its position in relation to the photo detector 40. On the other side, the handle 7 sits on the segments 45. The screw 46 inserted in the channel 41b expands the end 45b segments of the shaft extension, thus securing the handle and enable it to pass rotating torque to the spool. The fiber optic line 9 penetrates the cylindrical surface of the drum 60 of the spool via the arc shaped groove 43 created on the confronting surfaces of the abutted spool halves 48 and 49.

Figure 7:
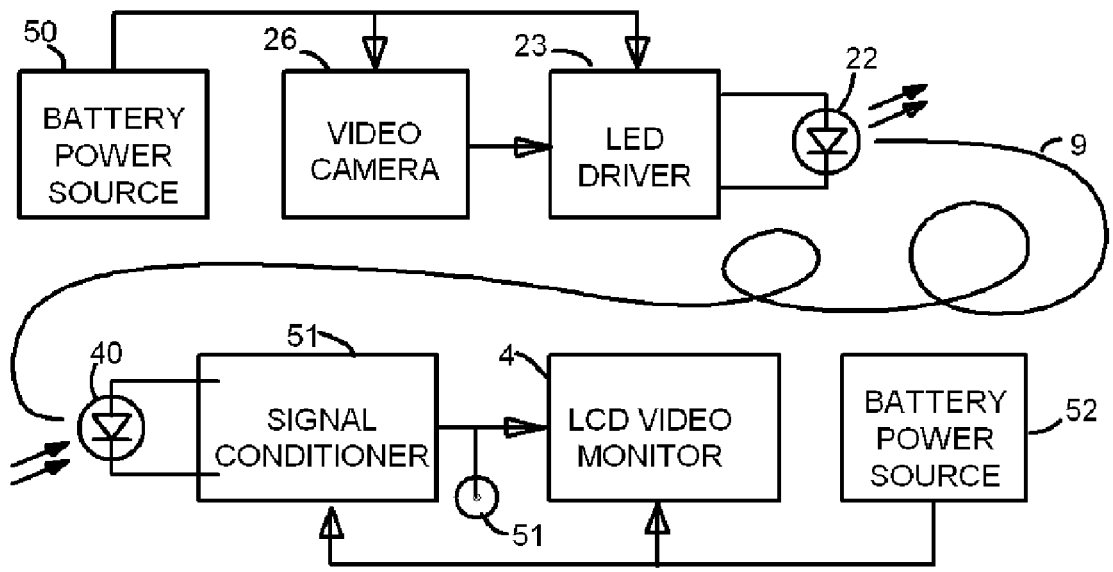
FIG. 7 shows a block diagram of the electronic components of the video fishing rod system.

Thus, the electrical video signal produced by the video device 26 and converted into the sequence of optical signals by the transmitter 23 with the LED 22, travels via the fiber optic line 9 and reaches the photo detector 40. The photo detector 40 converts the optical signal from the light form back into an electronic signal, which undergoes pre-processing by the receiver 39. Almost all or a portion of the length of the fiber optic line 9 is coiled around the spool 35. Typically, there is a small gap between the proximal end 41 of the fiber 9 and the receiving surface of the photo detector 40. This thin gap, left empty or filled with a clear silicon gel for better optical coupling, allows reception of the image even when the spool 35 is revolving. The video signal processed by the receiver 39 travels to the input of the portable video monitor 2, as shown on the FIG. 7. A suitable monitor 4 uses an LCD-type display panel equipped with a glare reflective or diffusing filter. Such monitor consumes little power and provides a good quality full color video image. When used in a bright sun light, a portable hood 5 helps to shade the screen from direct sun light for better contrast. In the next few years an organic LED (OLED) type portable displays are expected to become available. The OLED displays will offer even brighter image and improved contrast and power efficiency. The signal traveling through the fiber optic line is an analog video signal in a form of light energy amplitude-modulated by the TV signal produced by the video device 26 of the camera 11. The receiver 39 produces an NTSC standard signal compatible with all kinds of video products including the recorders. Thus, as shown on FIG. 7, the video fishing rod system can have a standard RCA connector 56 with the video signal available for connecting to an outside recorder. FIG. 7 presents the block diagram of the electronic and optical hardware of the invention. The battery power source 50, video device 26, LED driver 23 and LED 22 belong to the submersible camera unit 11. A single AA alkaline cell was able to provide 10 hours of uninterrupted operation between battery changes, using a CMOS color camera, and a simple current amplifier with an LED 22 functioning as a load. A preferred LED for use with plastic fiber operates at about 650 nm. The red wavelength is recommended for minimum attenuation in plastic fibers. However, a near infrared LED working in the spectral band from 700 to 800 nm also can deliver good performance. A video fishing rod system using these wavelengths can easily operate with 100 to 200 feet long optical fishing lines. The optical fiber fishing line 9, shown on the FIG. 7, optically connects the LED 22 with the receiving photo detector 40, which is located inside the fishing reel 38 (FIG. 6). The signal amplifier and conditioner 51 provide a standard NTSC signal to the LCD color monitor 4 and the auxiliary connector 56. The connector 56 can be used to hook up external devices such as larger size monitor or video recorder.

The FIG. 8 illustrates the way the submerged camera 11 looks when disposed in a horizontal direction with the help of string 54. An eyelet 53 is attached to the side of the submersible camera housing 11 approximately at the level of its determined center of gravity. The clamp 55 securely grips the optical fiber line 9 at the point, which is a few body lengths off of the top of the camera housing 17. The string 54 connects the eyelet 53 with the clamp 55. The length of the string 54 is short enough to force the fiber line 9 to make a loop as shown on the FIG. 8, thus placing the camera in to a horizontal orientation. The strain relief sleeve 18 shown on the FIG. 2 and FIG. 8 prevents the fiber optic line 9 from excessively sharp bends at its attachment with the camera housing 17. Alternatively, two eyelets 53a and 53b positioned on the side of the housing equidistantly from the center of gravity can be used. The string 54a is attached to them on both ends. The middle of the string is attached to the clamp 55. This arrangement secures the underwater camera 11 in horizontal position.

FIG. 9 shows how the string 54, when made long enough, can simply provide an additional back up security for prevention of camera loss.

FIG. 10 shows use of the submersible camera without a leader and a hook, simply for general observation.

FIG. 11 shows the leader 14 with the hook 16 is threaded through the swivel or a loop 15 that is attached to the center of the string 13 under the camera. The top end of the leader goes around the camera 11 and is connected to the clamp or a collet grip 55 positioned on the fiber optic line above the camera 11. In this situation the point of mechanical connection of the main fiber optic line 9 to the camera housing 17 does not experience the pooling force applied to the fishing hook 16. The loop or swivel 15 through which the leader line is threaded keeps the hook in the field of view α of the camera.

A working prototype has been built and successfully tested in both fresh and salt waters of Florida.

What is claimed is:

1. An underwater observation gear comprising, a miniature video camera enclosed together with a battery and fiber-optical transmitter in a water-tight enclosure having a window, a portable video monitor attachable to a handle, a fishing reel attached to said handle and having a monofilament fiber-optic line wounded on the spool and protruding through the channel axially located in the spool shaft, and a security string having two ends with both ends connected to the side of said camera straddling the camera center of gravity and with the middle of said string connected to the fiber optic line above the camera, for positioning the said camera horizontally, wherein said fiber-optic line is optically coupled with the said fiber-optical transmitter on one end and a fiber-optical receiver on the other end, and wherein the fiber-optic line is a plastic optically transmitting fiber having a cladding layer with the refraction index lower than the refraction index of the fiber core.

2. The underwater observation gear according to claim 1 where the fiber-optic line is a plastic optically transmitting fiber having a cladding layer with the refraction index lower than the refraction index of the fiber core and an additional mechanically protective top layer of durable plastic coating.

3. The underwater observation gear according to claim 1 where the optical transmitter is an LED or semiconductor laser based.

4. The underwater observation gear according to claim 1 where the optical signal traveling through the fiber-optic line is an amplitude modulated analog signal directly representing the analog electrical television signal and the said fiber-optical transmitter and receiver are analog type devices.

5. The underwater observation gear according to claim 1 where the optical signal traveling through the fiber-optic line is a digital signal representing the analog electrical television signal and the said fiber-optical transmitter and receiver are the digital type devices converting the analog signal into digital on the transmitting end and digital back to analog on the receiving end.

6. The underwater observation gear according to claim 1 where the said spool is made out of plastic or metal with the channel for the fiber optic line positioned on the axis and against the front side of said optical receiver.

7. A fishing gear comprising a fishing pole, a miniature video camera enclosed together with a battery and fiber-optical transmitter in a water-tight enclosure having a window, a fishing reel with a monofilament fiber-optic line wounded on the spool and protruding through the channel axially located in the spool shaft, said monofilament fiber optic line optically coupled with the said fiber-optical transmitter on one end and a fiber-optical receiver on the other end, a portable video monitor attachable to said fishing pole, a leader with a fishing hook positioned in the field of view of said camera, and a security string having two ends with both ends connected to the side of said camera straddling the camera center of gravity and with the middle of said string connected to the fiber optic line above the camera, for positioning the said camera horizontally, wherein the fiber-optic line is a plastic optically transmitting fiber having a cladding layer with the refraction index lower than the refraction index of the fiber core.

8. The fishing gear according to claim 7 further comprising a security string mechanically attached to the said leader and the fiber-optic line above the camera.

9. The fishing gear according to claim 8 wherein the security string is connected on one end to the side of said camera close to camera center of gravity and on the other end to the fiber optic line above the camera, positioning the said camera horizontally.

10. The fishing gear according to claim 7 where the said spool is made out of two halves joined together with fasteners or bonding material.

11. A method of fishing with an ability to observe and survey from above the water surface the situation under water around the fishing hook by replacing a conventional fishing line with a transmission-capable monofilament fiber-optic line having a cladding layer with the refraction index lower than the refraction index of the fiber core, and coupling optically one end of said fiber line with the fiber-optical transmitter placed inside of the submersible video camera and another end of said fiber line having wounded on the spool of the fishing reel and exited through the axially located channel and optically coupled with the fiber-optical receiver, said receiver converting the optical signal arrived through the said fiber line into an electrical signal and connecting said electrical signal with the video monitor mountable on said fishing pole, and wherein a security string having two ends with both ends connected to the side of said camera straddling the camera center of gravity and with the middle of said string connected to the fiber optic line above the camera, for positioning the said camera horizontally.

12. A video system for underwater observations comprising a monofilament fiber-optic line attached on one end to an optical transmitter of a submersible video camera, the fiber-optic line partially wounded on a spool and exiting from the spool through the channel at the spool axis, and on the other end optically coupled to an optical receiver of video monitoring equipment, and a security string having two ends with both ends connected to the side of said camera straddling the camera center of gravity and with the middle of said string connected to the fiber optic line above the camera, for positioning the said camera horizontally, and wherein the fiber-optic line is a plastic optically transmitting fiber having a cladding layer with the refraction index lower than the refraction index of the fiber core.

13. An underwater observation gear comprising, a miniature video camera enclosed together with a battery, fiber-optical transmitter and an LED illuminator in a water-tight enclosure having a window, a portable video monitor attachable to a handle, a fishing reel attached to said handle and having a monofilament fiber-optic line wounded on the spool and protruding through the channel axially located in the spool shaft, said monofilament fiber optic line optically coupled with the said fiber-optical transmitter on one end and a fiber-optical receiver on the other end, and a security string having two ends with both ends connected to the side of said camera straddling the camera center of gravity and with the middle of said string connected to the fiber optic line above the camera, for positioning the said camera horizontally, wherein the fiber-optic line is a plastic optically transmitting fiber having a cladding layer with the refraction index lower than the refraction index of the fiber core.

* * * * *